Dec. 10, 1940.   B. W. JONES   2,224,478

ENGINE STARTER GEARING

Filed Feb. 12, 1938

INVENTOR.

Burr W. Jones

BY Clinton L. James.

ATTORNEY

Patented Dec. 10, 1940

2,224,478

UNITED STATES PATENT OFFICE 2,224,478

ENGINE STARTER GEARING

Burr W. Jones, Elmira, N. Y., assignor, by mesne assignments, to Bendix Aviation Corporation, South Bend, Ind., a corporation of Delaware Application February 12, 1938, Serial No. 190,257

3 Claims. (Cl. 64—27)

The present invention relates to engine starter gearing and more particularly to a novel mounting for an engine flywheel gear employing elastic frictional material such as rubber.

In an effort to reduce noise and shock incident to the operation of engine starting devices, it has been proposed to insulate with sound-deadening material the ring gear usually mounted on the engine flywheel so as to eliminate the resonant effect of such mounting. The use of molded rubber seating rings for this purpose which are bonded to the interior of the ring gear and the periphery of the flywheel, while efficacious in transmitting the cranking torque smoothly and quietly, is expensive and requires special molds and other apparatus.

It is an object of the present invention to provide a novel starter gear drive which is smooth and quiet in operation while being simple and economical in construction.

It is another object to provide such a device incorporating a ring gear loosely mounted on the engine flywheel and connected thereto by means of a coupling element of rubber or the like.

It is a further object to provide such a device in which the coupling member insulates the ring gear from the flywheel and prevents the transmission of vibrations or shock from the ring gear to the flywheel.

It is another object to provide such a device in which the coupling element is maintained under pressure to frictionally transmit rotation from the ring gear to the flywheel.

It is another object to provide such a device in which the ring gear may be readily assembled on the engine flywheel by a rolling action of the shock absorbing ring whereby an effective frictional connection is secured.

Further objects and advantages will be apparent from the following description taken in connection with the accompanying drawing in which.

Figure 1:
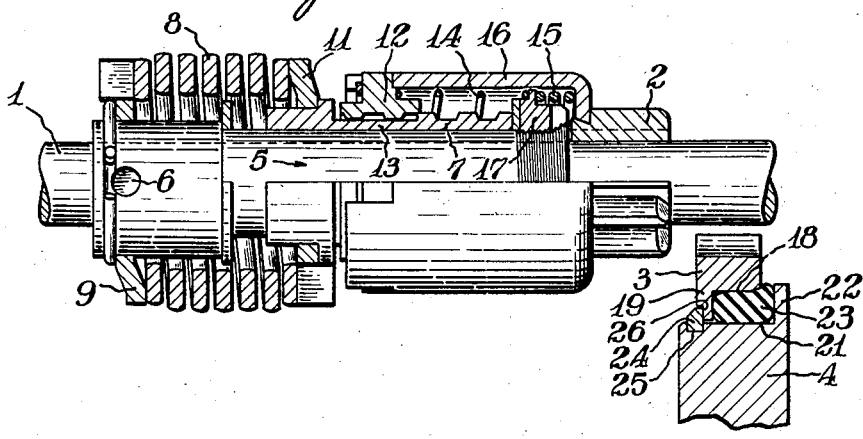
Fig. 1 is a side elevation partly in section of starter gearing embodying a preferred embodiment of the invention.

In Fig. 1 of the drawing, there is illustrated a commercial form of engine starter drive embodying a driving shaft 1 which may be the extended armature shaft of a starting motor, not shown, a pinion 2 slidably journalled thereon, and means for actuating the pinion from the drive shaft and moving it into and out of engagement with a ring gear 3 mounted on the flywheel 4 of the engine to be started.

As here illustrated, the actuating means comprises a hollow shaft 5 secured to the drive shaft 1 as by means of a pin 6, and a screw shaft 7 slidably journalled thereon yieldably connected to rotate therewith by means of a coiled spring 8 and anchor members 9 and 11 non-rotatably connected to the shafts 5 and 7 respectively.

A nut 12 is normally maintained on a smooth portion 13 of the screw shaft by an anti-drift spring 14, but is maintained in initial engagement with the threads by a reentry spring 15. The nut 12 is rigidly connected to the pinion 2 by means of a barrel member 16, and longitudinal movement of the screw shaft 7 and nut 12 toward the ring gear 3 is limited by a stop nut 17 on the hollow shaft 5.

Figure 2:
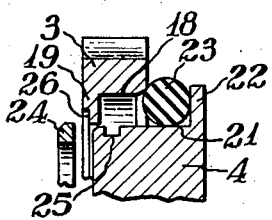
Fig. 2 is a sectional detail of the ring gear and flywheel structure illustrated in Fig. 1, the parts being shown in disassembled relation.

According to the present invention, the ring gear 3 is not mounted directly upon the flywheel 4, but the ring gear is provided with a recess 18 defined by flange 19, and the flywheel is provided with a seat 21 defined by a flange 22. A ring or band 23 of elastic material such as rubber having a high coefficient of friction and preferably of round cross section as illustrated in Fig. 2, is placed in the seat 21 of the flywheel 4 under suitable tension, and the ring gear 3 is thereupon pressed onto the flywheel so that the rubber ring 23 enters the recess 18, said ring being preferably arranged to roll on the surfaces of the seat and recess until it is suitably compressed between the flanges 19 and 22 as shown in Fig. 1.

Means for retaining the ring gear on the flywheel are provided in the form of a split lock ring 24 seated in a groove 25 in the periphery of the flywheel and engaging in a rabbet 26 in the side of the ring gear 3. It will be understood that the ring 24 is applied while the ring gear 3 is being pressed firmly against the rubber ring 23, after which when the pressure is relieved, the expansion of the rubber ring holds the ring gear in overlapping relation with the lock ring 24 and prevents its escape from the groove 25.

In the operation of this embodiment of the invention, actuation of the starter drive by energization of the starting motor causes the pinion 2 to be moved into engagement with the ring gear 3 by virtue of the threaded connection with the screw shaft 7. When the nut 12 engages the stop nut 17, the longitudinal movement of the pinion 2 is arrested and it is thereupon caused to rotate with the driving shaft through the yielding coupling formed by the spring 8 and its associated parts. When the engine starts, the excess rotation of the flywheel and ring gear causes the parts of the drive to be returned to their idle positions.

It will be understood that the rubber ring 23 acts as an insulating medium between the ring gear 3 and flywheel 4 whereby the shocks due to the engagement of the pinion with the ring gear, and the vibration of the driving operation, are not transmitted to the flywheel but are damped and rendered substantially noiseless.

Figure 3:
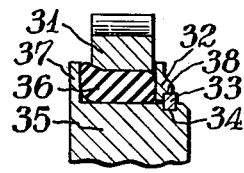
Figs. 3, 4, 5, 6 and 7 are sectional details of ring gear and flywheel structure showing various embodiments of the present invention.

In Fig. 3 a modified form of the invention is illustrated in which the ring gear 31 has a smooth internal surface, being retained by a thrust ring 32 positioned by a lock ring 33 seated in a groove 34 in the periphery of the flywheel 35. The rubber ring 36 is thus held compressed against the peripheral flange 37 of the flywheel, the lock ring 33 being held in its seat in a rabbet 38 in the thrust ring 32 by the expansion of the rubber ring 36.

Figure 4:
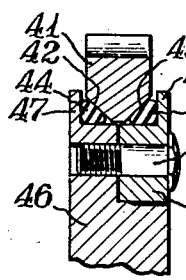

In Fig. 4 the ring gear 41 is provided with interior bevelled surfaces 42 and 43. A pair of rubber rings 44 and 45 are seated on the periphery of the flywheel 46 and are maintained in frictional engagement with the bevelled surfaces 42 and 43 by means of flanges 47 and 48. In order to provide for mounting and clamping the ring gear 41 on the flywheel 46, the periphery of the flywheel is medially split to form a clamping ring 49 carrying the flange 48, which is attached to the body of the flywheel 46 by suitable means such as studs 40.

Figure 5:
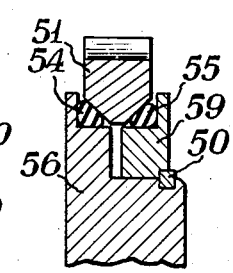

The structure illustrated in Fig. 5 is substantially similar to that shown in Fig. 4 with the exception that the clamping ring 59 is retained on the flywheel 56 by means of a split lock ring 50.

Figure 6:
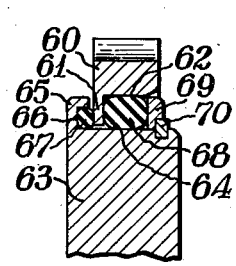

In Fig. 6 the ring gear 60 is provided with an inwardly extending flange 61 defining the recess 62 therein, and the flywheel 63 is provided with a smooth peripheral seat 64 and a flange 65 defining a recess 66. A rubber ring 67 is mounted in the recess 66 of the flywheel, after which the ring gear 60 is placed on the flywheel with its flange 61 in engagement with the rubber ring 67. A second rubber ring 68 is then introduced into the recess 62 of the ring gear, bearing on the seat 64 of the flywheel, and the parts are maintained assembled by means of a thrust ring 69 and lock ring 70.

Figure 7:
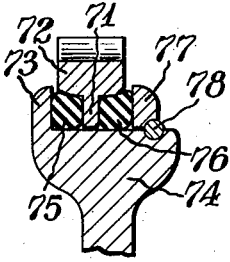

In Fig. 7 an inwardly extending flange 71 is formed medially in the ring gear 72. A radial flange 73 is formed on the periphery of the flywheel 74, and rubber rings 75 and 76 are seated on the periphery of the flywheel and maintained in frictional engagement with the interior of the ring gear by means of a thrust ring 77 and lock ring 78.

It will be appreciated that there is here provided an arrangement in which a starting ring gear is yieldably connected to the flywheel by structure which is economical to produce and easy to assemble and is capable of accomplishing the objects of the invention as above set forth.

Although certain embodiments of the invention have been shown and described in detail, it will be understood that other embodiments are possible and various changes may be made in the design and arrangements of the parts without departing from the spirit of the invention as defined in the claims appended hereto.

What is claimed is:

1. In an engine starter drive, an engine flywheel, a demountable ring gear on the flywheel, said flywheel having a peripheral channel of angular cross-section, and a longitudinally and rotarily resilient mounting for the ring gear on the flywheel comprising a rubber ring seated in said channel, of normally circular cross-section compressed longitudinally and radially between the ring gear and flywheel.

2. In engine starter gearing, an engine flywheel, a demountable ring gear on the flywheel, said flywheel having a peripheral channel of angular cross-section, and means for mounting the ring gear on the flywheel with freedom for yielding movement longitudinally and for transmitting rotation from the ring gear to the flywheel including a ring of elastically deformable material seated in said channel, formed normally with a circular cross-section of larger diameter than the space between the ring gear and flywheel, and means for holding the ring gear pressed on the flywheel over the elastic ring so as to compress the elastic ring longitudinally and radially to transmit torque from the ring gear to the flywheel solely by the friction of the engaging surfaces, said ring gear having means to lock the holding means in position responsive to the expansive force of the elastic ring.

3. In engine starter gearing, an engine flywheel having a peripheral channel formed therein, a ring gear surrounding the flywheel having a web extending into the peripheral channel, means in said channel for yieldingly supporting the ring gear and connecting the ring gear and flywheel for rotation in unison comprising a pair of rings of elastically deformable material seated in the channel on each side of said web, said rings being formed normally with a circular cross section of larger diameter than the space between the ring gear and flywheel, and means for holding the ring gear pressed on the flywheel over the elastic rings so as to compress the rings longitudinally and radially.

BURR W. JONES.